United States Patent
Nissen et al.

(10) Patent No.: US 6,635,296 B1
(45) Date of Patent: Oct. 21, 2003

(54) METHOD AND PLANT FOR TREATING MILK

(75) Inventors: Orla Nissen, Silkborg (DK); Erik Krabsen, Sporup (DK); Niels Klasusen Ottosen, Silkeborg (DK)

(73) Assignee: APV Pasilac A/S, Aarhus (DK)

( * ) Notice: Subject to any disclaimer, the term of this patent is extended or adjusted under 35 U.S.C. 154(b) by 0 days.

(21) Appl. No.: 09/980,491
(22) PCT Filed: May 31, 2000
(86) PCT No.: PCT/DK00/00297
  § 371 (c)(1),
  (2), (4) Date: Mar. 1, 2002
(87) PCT Pub. No.: WO00/74495
  PCT Pub. Date: Dec. 14, 2000

(30) Foreign Application Priority Data
Jun. 4, 1999 (DK) .................................. 1999 00790

(51) Int. Cl.[7] .............................. A23C 3/00; A23C 9/142
(52) U.S. Cl. ........................................ 426/422; 426/583
(58) Field of Search .................................. 426/583, 422

(56) References Cited

U.S. PATENT DOCUMENTS

| | | |
|---|---|---|
| 4,105,547 A | 8/1978 | Sandblom |
| 5,256,437 A | 10/1993 | Degen et al. |
| 5,683,733 A | 11/1997 | Krabsen et al. |
| 5,685,990 A | 11/1997 | Saugmann et al. |

FOREIGN PATENT DOCUMENTS

| | | |
|---|---|---|
| DE | 43 19 813 A1 | 12/1993 |
| DE | 4319813 | 12/1993 |
| EP | 0 194 286 B1 | 11/1990 |
| WO | WO 89/11226 | * 11/1989 |
| WO | WO 94/13148 | 6/1994 |
| WO | WO 97/49295 | 12/1997 |
| WO | WO 9749295 | 12/1997 |
| WO | WO 9857549 | 12/1998 |
| WO | WO 98/57549 | 12/1998 |

OTHER PUBLICATIONS

"Hyperfiltration and Ultrafiltration in Plate–and–Frame Systems", Rud Frik Madsen, Elsevier Scientific Publishing Company, 1977, p. 134, fig. 4.23.

Perry's Chemical Engineers' Handbook, Perry et al., 6th edition 1984, p. 17–32, fig. 17–29.

* cited by examiner

Primary Examiner—Anthony J. Weier
(74) Attorney, Agent, or Firm—McDermott, Will & Emery

(57) ABSTRACT

A plant and method of treating low-fat milk, such as skim milk, so as to obtain with a low content of spores and bacteria, wherein the milk is subject to a first microfiltration causing a separation into a first permeate, the first permeate being subjected to an additional microfiltration. This double microfiltration ensures that the acceptable limits for bacterial counts in milk products are not exceeded in case of a membrane breakdown.

13 Claims, 3 Drawing Sheets

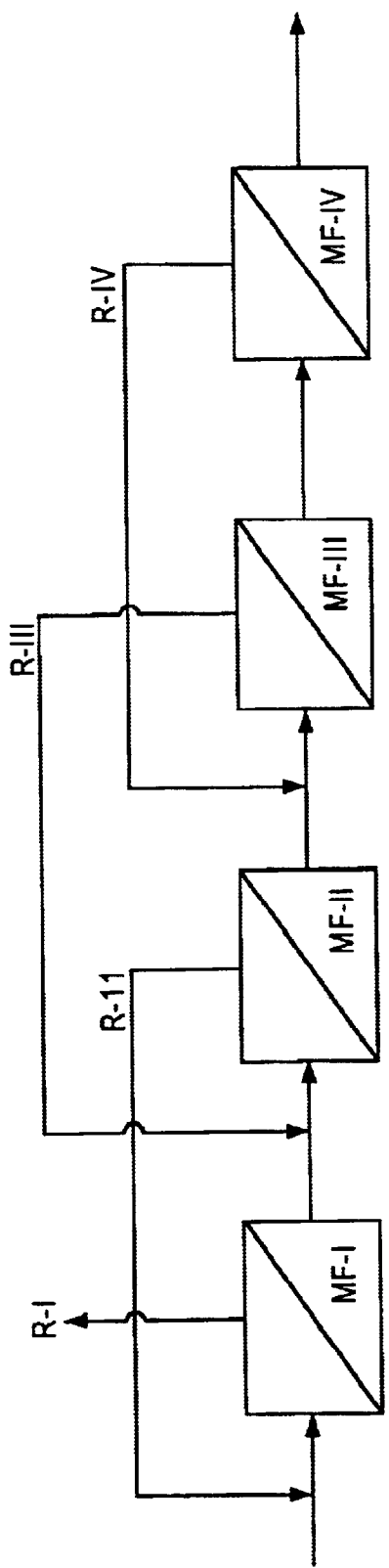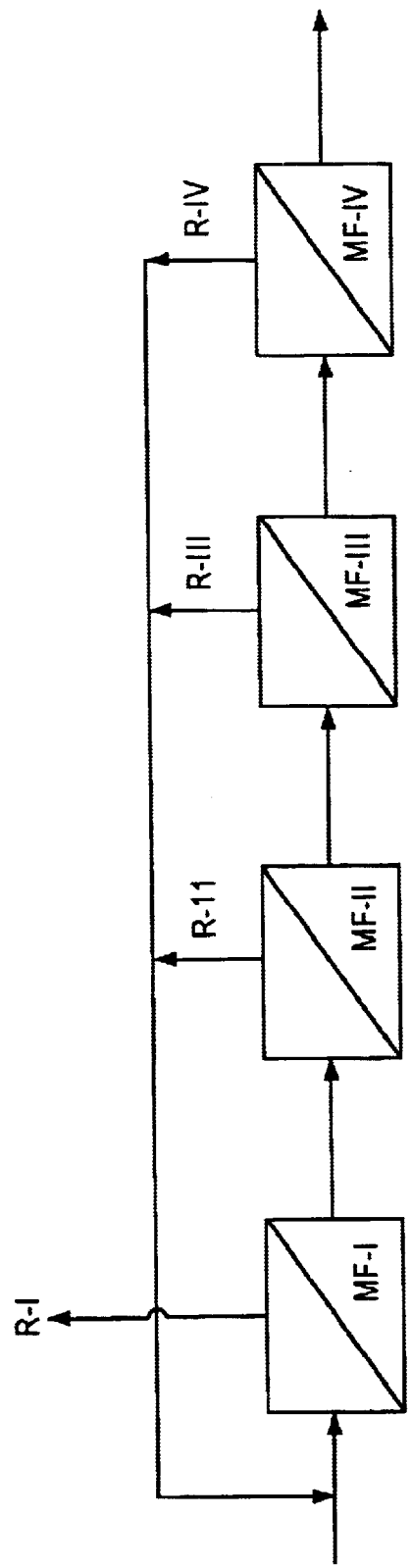
Fig. 3
Fig. 4

METHOD AND PLANT FOR TREATING MILK

TECHNICAL FIELD

The present invention relates to an improved method and an improved plant for treating milk so as to obtain milk with a reduced content of spores and bacteria, wherein low-fat milk, such as skim milk, is subjected to microfiltration causing a separation into a spore- and bacteria-containing retentate and a permeate in form of a milk fraction, the content of milk proteins being substantially maintained and the content of spores and bacteria being considerably reduced. The treated low-fat milk may be used in this form or may be mixed with a fatty milk fraction, such as cream, which has been subjected to a bacteria-controlling treatment, eg a heat treatment, so as to produce standardized milk. The treated milk and the standardized milk are both suitable for direct consumption and as raw material for processed dairy products, eg for making cheese. The improvement in the method and the plant is in a special arrangement of the equipment for the membrane filtration which renders a more efficient removal of bacteria and spores and which is more safe in case of a membrane breakdown.

BACKGROUND ART

Danish printed accepted application No. 164.722 and the corresponding EP patent No. 0 194 286 (Holm et al.) disclose a plant for treating milk in such a manner that the milk has a low bacterial content. Fatty milk is divided by centrifugation into a cream fraction and a skim milk fraction. The skim milk fraction is caused to pass through a microfilter, in which the fat globules and the bacteria are separated off. The microfiltration results in a permeate consisting of skim milk with a low bacterial content and a retentate (concentrate) having a higher content of fat and bacteria than the permeate. The retentate is combined with the cream fraction resulting from the centrifugation, and the obtained mixture is sterilised. The sterilised material or a portion thereof is combined with the permeate to obtain milk with the desired fat content. The advantage of this known method is that only a minor fraction of the milk need be sterilised in order nevertheless to obtain standardised milk with a low bacterial content. The combination of a centrifugal separation and microfiltration provides a significantly increased capacity of the microfilter.

DK 169 510 and the corresponding EP 0 697 816 (Krabsen et al.) disclose a similar plant, in which, however the retentate resulting from the microfiltration is recirculated to centrifugal separator, ie mixed with the added milk and centrifuged therewith, instead of being combined with the cream fraction. Bacteria and spores thus being recirculated to the centrifugal separator, are, however, not accumulated in the plant, as they are continuously or discontinuously removed with a sludge fraction. This possibility of removing sludge is known from many conventional centrifugal separators.

Microfiltration processes using the cross-flow principle, eg the processes used in the above plants, may be carried out by employing conventional microfiltration units of differing structural shapes. As a basic model a microfiltration unit (MF unit) with cross flow may be formed of a container divided by a microfiltration membrane into two chambers, a feed/rententate chamber and a permeate chamber. The retentate chamber is provided with a feed conduit for feeding the material to be filtered, and a retentate outlet. The permeate chamber is provided with a permeate outlet. Between the retentate chamber and the permeate chamber a pressure difference is etablished forcing the fluid and small particles through the membrane. The feed material is fed through the retentate chamber from one side along the membrane. On the other side of the retentate chamber the retentate is removed, said retentate consisting of the fluid and the particles, which have not passed through the membrane to the permeate chamber during the passage along the membrane. In order to prevent the membrane surface from being fouled too quickly, which causes clogging of the membrane pores, the flow rate (cross-flow rate) over the surface of the membrane should not be too low. This is often ensured by recirculating a portion of the retentate flow to the feed conduit. It is also well-known to recirculate a portion of the permeate to ensure a uniform pressure drop, the permeate chamber in addition to the permeate outlet also being provided with an inlet for receiving recirculated permeate. This principle is described in U.S. Pat. No. 4,105,547 (Sandblom). Such recirculation conduits for retentate or permeate leading to the same respective retentate chamber or permeate chamber from which said material has flown, are considered as components forming part of a basic model of the microfiltration unit.

For large scale plants a larger membrane area may be needed and often this is obtained by interconnecting a large or small number of the above basic models. Accordingly, a large filtration area may be obtained by parallel coupling several basic models. This principle is for instance described in connection with ultrafiltration of whey by Rud Frik Madsen in "Hyperfiltration and Ultrafiltration in Plate-and-Frame Systems", Elsevier, 1977, page 134, FIG. 4.23. It is also known to interconnect several filtration units in series such that the portion of the retentate resulting from the first unit, which is not recirculated, is added as feed material to the subsequent filtration unit, etc. This principle is for instance shown in Perry's Chemical Engineers' Handbook, 6th edition 1984, page 17–32, FIG. 17–29.

U.S. Pat. No. 5,685,990 (Saugmann et al.) discloses how to membrane filtrate an aqueous dispersion by employing several primary membrane units interconnected in such a manner that the retentate or a portion of the retentate resulting from a membrane filtration step is used as feed material for one or more subsequent steps, while the permeate from said primary filtration steps is concentrated by evaporation or in a secondary membrane filtration step, in which the concentrate or the secondary retentate is recirculated to the aqueous feed dispersion in one or more of the primary filtration steps. As an essential feature the membranes in the secondary membrane filtration step should have a smaller pore size or molecular cut-off value in relation to the membranes in the primary filtration steps. Examples of the primary filters are ultrafiltration filters (UF filters), while the secondary filters may be hyperfiltration filters (HF filters), which are also known as RO filter, RO denoting reversed osmosis.

WO 94/13148 (Bounous et al.) discloses a process for producing an undenatured whey protein concentrate from skim milk, microfiltration being carried out in a first step with a microfilter retaining bacteria, but allowing the skim milk containing both whey proteins and other milk proteins, such as casein, to pass through the filter, and in a subsequent step microfiltration being carried out with another type of microfilter retaining casein, but allowing the whey proteins to pass. The known method thus cannot be used for producing a milk fraction in which the content of all types of milk proteins, ie both casein and whey proteins, are substantially maintained, while the content of spores and bacteria is considerably reduced.

The use of microfiltration for removing bacteria from a low-fat milk fraction as described in DK 164.722 and DK 169.510 is advantageous in that the bacteria may be removed without heat treatment which is substantially more gentle to the milk components. As a result the good taste is preserved and a denaturation of proteins and other changes of the properties of the milk can be avoided. In addition it is prevented that the milk fraction contains heat-treated and thus dead bacteria. Even when the skim milk fraction subsequently is to obtain a desired fat content by being mixed with heat-treated cream, the result is still an improved product as regards taste and the preservation of proteins. Products treated in this manner are suitable both for direct consumption and as raw material for processed milk products, such as yoghurt and cheese.

Today's microfiltration membranes are highly reliable and membrane breakdowns are very rare. Although the probability of a membrane breakdown is very small, the risk cannot be completely excluded. Membrane breakdowns do cause serious problems. It is a problem—even at frequent sampling for determining bacteria—that the result of such a determination usually is not available until one or several days after the sampling. Thus, several days may pass before it can be ascertained whether the permeate from the microfiltration has a too high bacterial count. When producing non-industrial milk, the milk is usually tapped shortly after the microfiltration for which reason the risk exists that large amounts of milk either have to be discarded or used to another purpose. However the tapped milk may already have been distributed to the stores and further on to the consumers before the high bacterial count has been found, which may entail a withdrawal of the milk and pose a health risk to the consumers. Such incidences may be highly detrimental to the goodwill and economy of the dairy.

The above serious problems in connection with membrane breakdowns entail that the authorities as a rule demand that microfiltrated milk for consumption must be subjected to a minimum of heat treatment, eg pasteurization at 72° C. for fifteen seconds as a supplement to the microfiltration. This is primarily demanded in order to eliminate the presence of pathogenic bacteria.

The supplementary heat treatment limits the above advantages of the use of microfiltration instead of the conventional bacterial destruction by heat treatment. Also at this mild pasteurization undesirable changes occur in the properties of the milk—although on comparatively small scale.

A need thus exists for carrying out microfiltration of milk in a more secure manner, whereby the damages arising at a membrane breakdown, are practically completely avoided and preferably in such a manner that the supplemental pasteurization is rendered superfluous.

It has now been found that the desired increased safety can be obtained by using at least two membrane units interconnected in a special manner.

DESCRIPTION OF THE INVENTION

The present invention thus relates to a plant for treating low-fat milk, such as skim milk, so as to obtain a reduced content of spores and bacteria and a substantially unchanged content of milk proteins, said plant comprising a feed conduit for milk coupled to a first microfiltration unit, MF-I, separating the milk into a spore- and bacteria-containing first retentate, R-I, and a first permeate, P-I, with a lower content of spores and bacteria, said microfiltration unit, MF-I, being coupled to a conduit for the first retentate, R-I, and a conduit for the first permeate, P-I. The plant is characterised in that after the microfiltration unit, MF-I, the permeate conduit is coupled to a second microfiltration unit, MF-II, for separating the first permeate, P-I, into a second retentate, R-II, and a second permeate, P-II, said second microfiltration unit, MF-II, being coupled to a conduit for the second retentate, R-II, in form of a recirculation conduit leading to the first microfiltration unit, MF-I, and to a conduit for the second permeate, P-II.

The invention also relates to a method of treating low-fat milk, such as skim milk, so as to obtain milk with a reduced content of spores and bacteria and a substantially unchanged content of milk proteins, where the milk is subjected to microfiltration causing a separation into a spore- and bacteria-containing retentate and a permeate with a reduced content of spores and bacteria, said method being characterised in that the permeate resulting from the microfiltration is subjected to an additional microfiltration.

According to a preferred embodiment of the method according to the invention the retentate from the second microfiltration step is recirculated to the feed side for the first microfiltration step.

The special interconnection of two or optionally more microfiltration units increases the safety significantly, the product flow, ie the second permeate, having passed through two independent microfiltration membranes. As the probability of a microfiltration membrane breakdown is very small, as mentioned above, simultaneous breakdowns of both microfiltration membranes are highly unlikely.

Conventional filtration processes can be performed as so-called dead-end-filtrations, in which a fluid containing a sediment is led through a filter retaining the sediment and allowing the filtrate to pass through the filter. The drawback of dead-end-filtration is that the openings of the filter clog quickly, whereby the flow through the filter, the flux, quickly drops to an unacceptable low level. Consequently dead-end-filtration has primarily been used for macrofiltration, where the openings in the filter exceeds 5–10 $\mu$m and where the sediment consists of comparativel large particles such that the filter cake has suitable openings to allow the filtrate to pass therethrough.

At membrane filtration including microfiltration, where the openings or pores for passage through the membrane are less than 2–5 $\mu$m and where the particles or molecules to be retained as "sediment", typically are of a size only slightly larger than the pores, dead-end-filtration usually cannot be used, as the filter clogs all too quickly. The above cross-flow principle solves this problem, as the sediment is removed as a flowable phase, the retentate, which in theory may be regarded as a dispersion of the sediment in a dispersion medium. In this case the dispersion medium has substantially the same composition as the permeate.

The advantage of cross flow is in the increased flux which is a condition for the operating economy. A drawback is that a portion of the material intended to be transferred to the permeate remains in the retentate. In such cases, where the permeate contains the desired end product, the retentate is conventionally subjected to an additional separation treatment, eg an additional membrane filtration. The conventional series coupling of several membrane units thus is based on the principle for instance described in Perry's Chemical Engineers' Handbook, 6th edition 1984, page 17–32, FIG. 17–29, in which the retentate from the first membrane filtration unit is led to the subsequent unit. The present invention departs from this conventional principle in that in this case it is the permeate and not the retentate from the first unit which is subjected to an additional microfiltration.

When microfiltrating low-fat milk for removal of bacteria and bacterial spores by employing the cross-flow principle, a portion of the milk protein and other milk components, which would have been valuable components of the product, ie ideally transferred to the permeate, flow out with the retentate. Moreover also a small quantity of spores and bacteria, which should have been retained by the filter, pass through the membrane to the permeate due to variations in the pore sizes of the membranes, whereby a small number pores may be present of a sufficiently large size to allow some bacteria and in particular bacteria spores to pass therethrough.

By using the special coupling of MF units according to the invention, in case of a breakdown of one of MF units, the second permeate has a slightly higher bacterial count which is detected at the regular bacteriological control tests. However, the increase in the bacterial count is only relatively modest such that the product tapped during the period of time from the membrane breakdown to the result of the control test is known, still has a bacterial count which is within the acceptable limits.

The above advantage is not obtained when using the conventional membrane unit couplings. In the conventional parallel coupling merely an increased membrane area is obtained, an assembled system of membranes coupled in parallel in reality operating as a single membrane unit having a large surface.

In the conventional series coupling described in Perry's Chemical Engineers' Handbook, 6th edition 1984, page 17–32, FIG. 17–29, in which the retentate from the first membrane unit is led as feed material to the subsequent membrane,unit, a breakdown of merely one of the membrane units allow bacteria direct access to the product flow. The use of several membrane units thus does not increase the safety.

In case low-fat milk is microfiltered according to the principle used according to U.S. Pat. No. 5,685,990 (Saugmann et al.), ie, the first filtration unit having a considerably larger pore size than the second filtration unit, a comparatively large number of bacteria and bacteria spores pass through the first filtration unit, which thus only acts as a preliminary coarse filtration, whereafter the spores and bacteria are retained by the second filtration unit. In this case the prevention of bacteria and spores passing into the treated milk—in particular at a breakdown of the second filtration unit—is considerably smaller compared to the risk with two intercoupled microfiltration units, which both efficiently retain bacteria, according to the idea of the present invention.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

The plant according to the invention is suitable for the removal of bacteria from low-fat milk, such as skim milk, prepared at conventional centrifugation. The plant may advantageously be combined with a centrifugal separator and may thus comprise a centrifugal separator unit for separating the milk into a cream fraction CR, a skim milk fraction SM and optionally a sludge fraction SL; a conduit for the skim milk fraction coupled to a first microfiltration unit MF-I for separating the skim milk fraction SM into a spore- and bacteria-containing first retentate R-I and a first permeate P-I with a lower content of spores and bacteria, MF-I being coupled to a conduit for R-I and a conduit for P-I and the conduit for P-I being coupled to a second microfiltration unit MF-II for separating the first permeate P-I into a second retentate R-II and a second permeate P-II, MF-II being coupled to a conduit for R-II optionally in form of a recirculation conduit leading to the first microfiltration unit MF-I, and to a conduit for P-II, respectively.

In such a plant the centrifugal separator unit is further coupled to a conduit for the cream fraction CR. The cream conduit may in turn be coupled to a bacteria-controlling unit which in turn is coupled to a conduit for the cream treated in the bacteria-controlling unit, said conduit being coupled to a uniting conduit to which the conduit for the second permeate P-II is coupled, in such a manner that the treated cream or a portion thereof and the permeate are united in the uniting conduit so as to form standardized milk.

The term standardized milk denotes a milk product, which by mixing a low-fat milk fraction and the necessary amount of a milk fraction with a high fatty content, such as cream, has been adjusted to a desired fat content standardized for the product type in question.

In order to ensure that bacteria and bacteria spores are retained equally efficiently in both MF units such that only few bacteria pass through to the permeate in case of a membrane breakdown—regardless of which MF unit has broken down—it is preferred that the first microfiltration unit and the second microfiltration unit have substantially the same pore size.

Thus, the average pore sizes of the two membrane units differ less than 50%, preferably less than 20% and most preferably less than 10%, from each other.

The microfiltration units forming part of the plant according to the invention may have any conventional shape. Examples hereof are any type selected from among the plate-and-frame system, a tubular system, a spiral-wound system, a cassette system and the hollow fibre principle or a combination thereof;

Each microfiltration unit may comprise one or more microfiltration membranes preferably having a pore size ranging from 0.1 to 2.0 $\mu$m, particularly preferable from 0.4 to 1.8 $\mu$m and most preferred from 0.8 to 1.4 $\mu$m.

It is essential that both MF units are able to retain bacteria efficiently. If slightly differing pore sizes are used, it is thus essential that the upper limit of about 2.0 $\mu$m in pore size is maintained. According to an embodiment the first microfiltration unit may have a pore size ranging from 0.8 to 2.0 $\mu$m, while the second microfiltration unit has a pore size ranging from 0.1 to 2.0 $\mu$m.

Each MT unit is usually adapted such that the filtration factor calculated as weight amount of retentate in relation to the feed amount ranges from 1 to 20% by weight for each microfiltration step.

By using the plant according to the invention the advantages according to DK 164 722 or DK 169 510 may also be obtained. The conduit for the first retentate (R-I) may thus be coupled such that the first retentate (R-I) is mixed with the cream fraction (CR) prior to the bacteria-controlling unit. Alternatively the conduit for the first retentate (R-I) may be in form of a recirculation conduit leading to the centrifugal separator unit. In the latter case also the conduit for the second retentate (R-II) may be coupled to a feed conduit of the centrifugal separator unit such that both R-I and R-II are recirculated to the centrifugal separator unit as taught in DK 169 510.

In order to further increase the safety the plant according to the invention may comprise three or more membrane units coupled in series, in which the permeate conduit from the second membrane unit (MF-II) is coupled to a third membrane filtration unit (MF-III), the permeate conduit thereof optionally being coupled to one or several subsequent membrane filtration units (MF-IV . . . ),and in which each permeate conduit apart from the last one is coupled to the subsequent membrane filtration unit as its feed conduit and in which at least one retentate conduit is a recirculation conduit for feeding to a preceding membrane filtration unit. By using such an embodiment comprising more than two MF units, the safety is further enhanced. The number of MF units is naturally selected with a view to the increased initial expenditure and the operational expenditure incurring in connection with an increased number of MF units. However to compensate for these increased costs it is possible to form and adjust the individual, especially the latest, MF units for a higher flux and thus to a higher capacity, eg with a slightly larger pore size and/or an increased transmembrane pressure, where the retainment of bacteria may be slightly less efficient for the individual MF unit. In this case the increased number of MF units still efficiently reduces the bacterial count in the last permeate. When three membrane units are used, at least two intact MF units remain in case of a membrane breakdown and it is thus unlikely that the acceptable limits for the bacterial count in the last permeate are exceeded.

In the present description and claims the term microfiltration unit (MF unit) not only denotes the above basic model, but also more complex filtration plants which in principle may be described as several MF basic models parallel coupled in a known manner, in series or by a combination of series and parallel couplings, provided such a MF unit (when seen from the outside) is provided with feeder conduit, a retentate draining conduit and a permeate draining conduit. In this context any recirculation conduits, which do not lead the material away from such a simple or more complex MF unit, are to be regarded as a component of the MF unit in question.

BRIEF DESCRIPTION OF THE DRAWINGS

The invention is described in greater detail below with reference to the accompanying drawings and an example, in which FIG. 3 illustrates a flow diagram of the principle of four MF units, in which the retentates from each of the last three units are recirculated to the preceding MF unit, and FIG. 4 illustrates a flow diagram of the principle of four MF units, in which the retentates from each of the last three units jointly are recirculated to the first MF unit.

Figure 1:
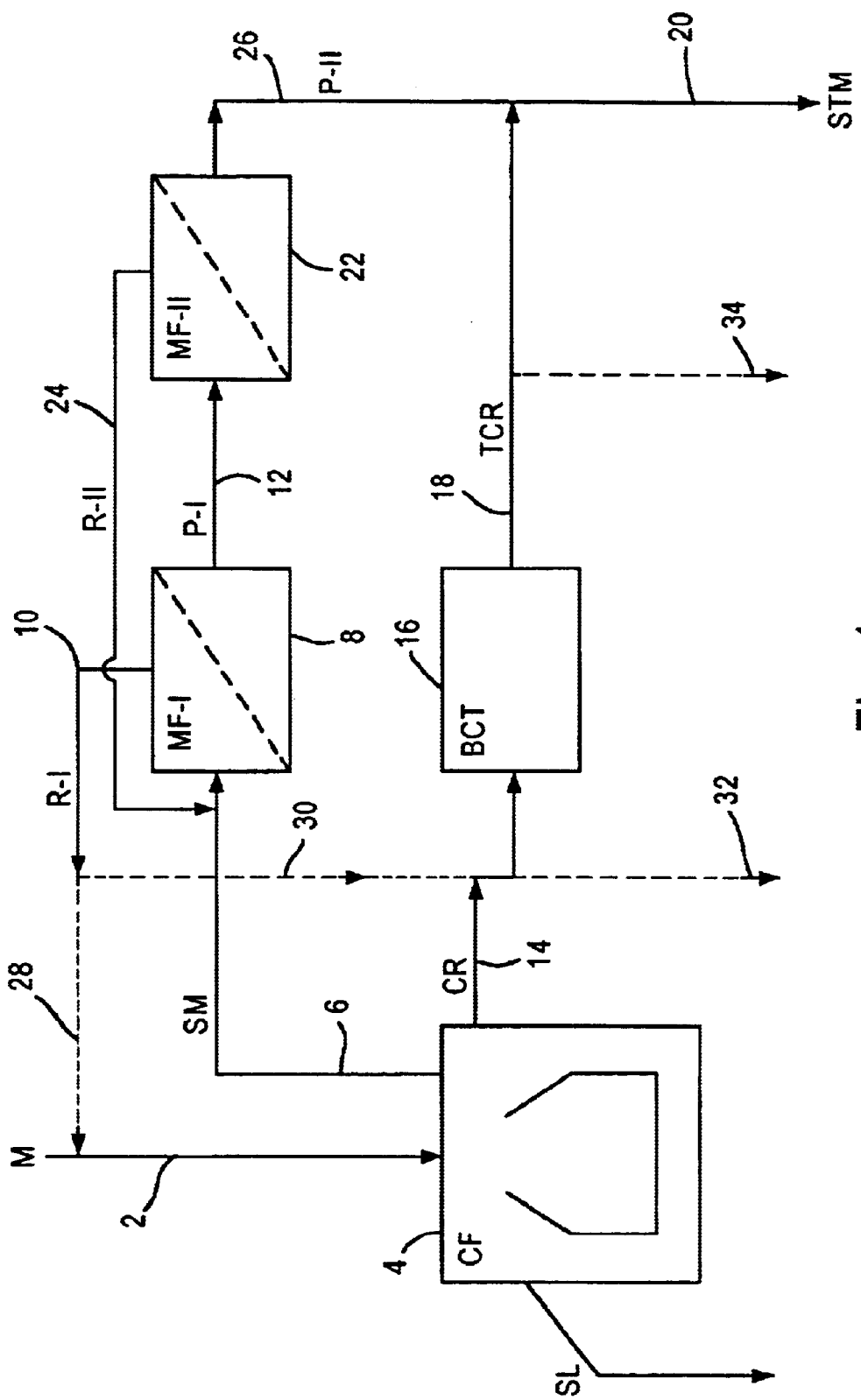
FIG. 1 illustrates a flow diagram of the principle of a plant, in which milk is initially separated into in cream and skim milk, and in which the microfiltrated milk is mixed with heat-treated cream so as to obtain standardized milk.

In the drawing the following abbreviations have been used:

M: milk
CF: Centrifugation
CR: Cream
SM: Skim milk
SL: Sludge
MF-I, MF-II, etc.: first, second, etc. microfiltration
BCT: Bacteria-controlling treatment
R-I, R-II, etc: first, second, etc. retentate
P-I, P-II, etc. first, second, etc. permeate
TCR: Cream treated with bacteria-controlling treatment.
STM: Standardized milk.

BEST MODE FOR CARRYING OUT THE INVENTION

The principle of the method and the plant according to the invention appears from FIG. 1, in which fatty milk (M) is passed through a conduit 2 to a centrifugal separator unit 4. In the centrifugal separator unit 4 the milk is separated into a cream fraction (CR) and a skim milk fraction (SM) and optionally continuously or discontinuously bacteria-containing sludge (SL) may be separated off therein. The skim milk fraction is carried through a conduit 6 to a first microfiltration unit 8, where a separation into a bacterial spore- and bacteria-containing first retentate (R-I) and a first permeate (P-I) with a low content of bacterial spores and bacteria takes place. In a first embodiment the retentate (R-I) is recirculated to the centrifugal separator unit 4 through a conduit 10,28. In an alternative embodiment the first retentate (R-I) is passed through a.conduit 10, 30 jointly with the cream fraction (CR) from the centrifugal separator unit 4 for treatment with the cream fraction, as described below. The cream fraction (CR) resulting from the centrifugation containing some bacterial spores and bacteria is led through a conduit 14 (in the alternative embodiment jointly with the first retentate (R-I)) to the bacteria-controlling unit 16, eg a sterilisation unit, in which the cream is sterilised in a conventional manner or treated in another manner for controlling, ie. destroying, bacteria and spores. The thus treated cream (TCR) is passed through a conduit 18 and may, if desired, be separated into an excess cream passed through a conduit 34. as well as a portion led to the uniting conduit 20 to be united with a permeate (P-II) with a low content of spores and bacteria, which is described in detail below, so as to obtain standardized milk. If desired, the excess cream may also be removed prior to the treatment in unit 16, eg through a conduit 32.

Most of the bacteria and spores contained in the skim milk fraction resulting from the centrifugation are collected in form of a retentate at the microfiltration. In the first of the said embodiments these bacteria and spores are recirculated with the first retentate (R-I) to the centrifugation, where a sludge (SL) with a high content of bacteria and spores is separated during the centrifugation.

In the alternative embodiment the first retentate (R-I) is combined with the cream fraction (CR) and treated together therewith in the unit 16 for controlling spores and bacteria, eg by heat-treatment, such as heat sterilisation.

The first permeate (P-I) resulting from the first microfiltration unit 8 is led through a conduit 12 to a second microfiltration unit 22, in which a separation takes place into a second retentate (R-II); which still may contain some amount of spores and bacteria, and a second permeate (P-II), in which the content of spores and bacteria is further reduced compared to the content thereof in the first permeate (P-I). This extremely pure second permeate (P-II) is led through a conduit 26 to the uniting conduit 20, in which it is mixed with the treated cream fraction so as to obtain standardized milk (STM).

The second retentate (R-II) is recirculated through a conduit 24 and united with the skim milk (SM) resulting from the centrifugal, separator unit 4 in the conduit 6 and fed as feed material into the first microfiltration unit 8.

In a few cases one or more of the bacteria-containing retentates may be used for another purpose after a necessary heat treatment. It may also occur that a sufficiently economic advantage cannot be obtained by recirculation and thus by the utilization of the retentate components. Apart from these rather uncommon cases, there are usually a significant advantage in recirculating the retentates and thus in utilizing their valuable components. Such recirculations are particularly preferred when. according to the teaching of DK 169 510 heat treatment of the retentates can be avoided.

Figure 2:
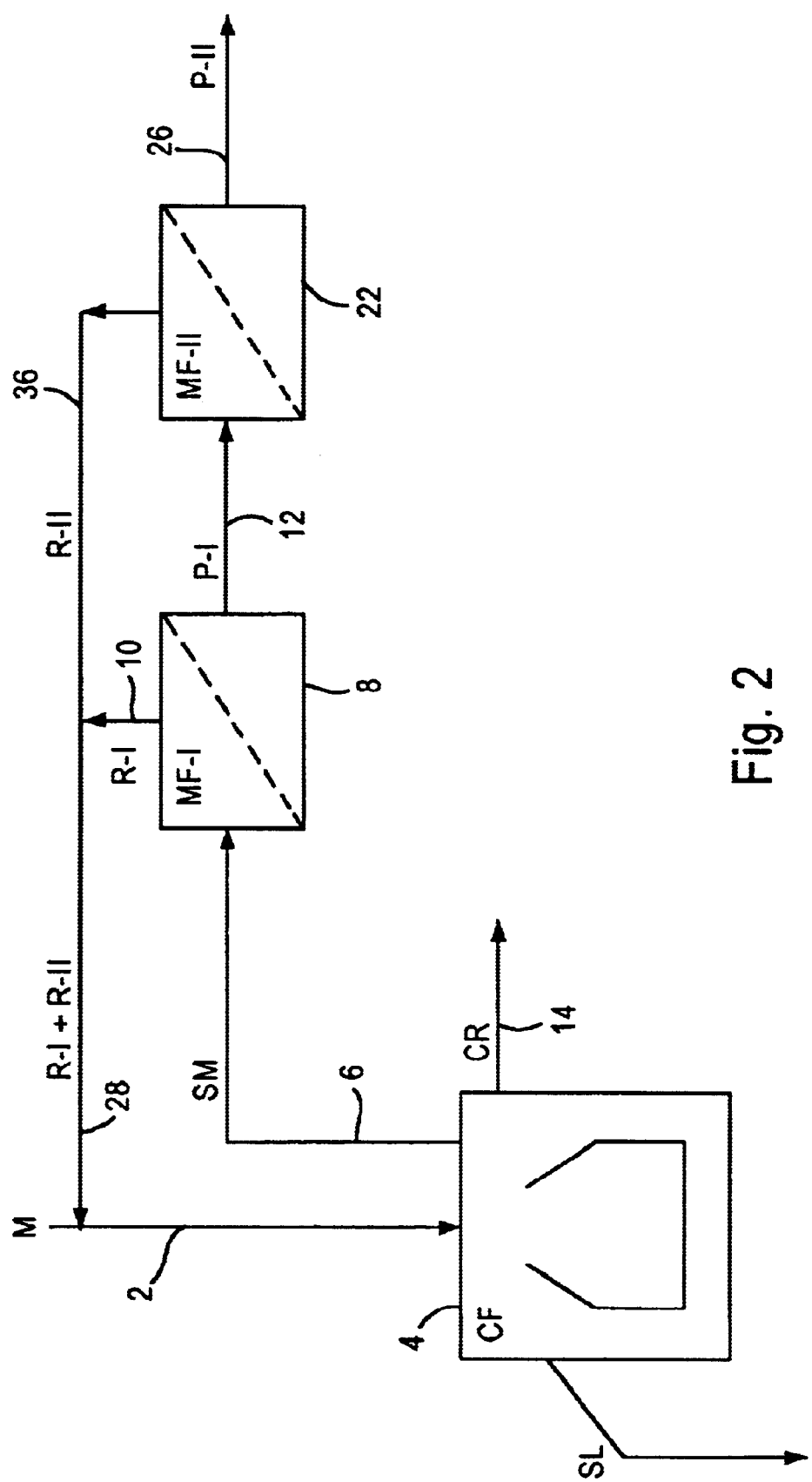
FIG. 2 illustrates a flow diagram of the principle of a plant according to an embodiment, in which the retentates from the two microfiltration steps are mixed with untreated fatty milk and then led to a centrifugal separator.

FIG. 2 illustrates a plant with an alternative manner of recirculating the second retentate, R-II. The components, which are also shown in FIG. 1, have the same reference numerals in FIG. 2. In this plant the second retentate R-II is led through a conduit 36 jointly with the first retentate, R-I, from the conduit 10 and further through the conduits 28 and 2 back to the centrifugal separator unit. R-II is thus still recirculated to MF-I, R-II following the path through the conduits 36,28 and 2 along the relevant flow path through the centrifugal separator unit 4 and further through the conduit 6 leading to the first microfiltration unit M-I.

FIGS. 3 and 4 are diagrammatic views of two embodiments selected among several possible embodiments for interconnecting more than two MF units, here shown with four MF units, by employing the basic idea of the invention, ie that the series coupling of the MF units takes, place by passing the permeate from one unit as feed material to the subsequent unit, and by recirculating the retentates to the preceding MF units, provided the retentates are not utilized in another manner. As shown in FIG. 3 the recirculation may take place to the immediately preceding MF unit or as shown FIG. 4 to the first MF unit, MF-I.

EXAMPLE

The present example illustrates the use of a plant according to the invention with an embodiment as shown in FIG. 1, in which the first retentate R-I in this case is led through a conduit 28 back to the centrifugal separator unit 4 according to the principle known from DK 169 510. The alternative conduit 30 shown in FIG. 1 has thus been omitted.

The microfiltration membranes in the two MF units MF-I and MF-II have a pore size of about 1 $\mu$m and both MF units operates at a filtration factor of 10%, which means that 100 parts by weight of feed material are divided into 10 parts by weight of retentate and 90 parts by weight of permeate.

By treating 1000 kg. of untreated milk per hour the following mass balance is obtained for the individual fractions:

|  | Amount kg./h | bacterial spores number per ml | Total number of bacteria per ml |
| --- | --- | --- | --- |
| Untreated milk (M) | 1000 | 20 | 370,000 |
| Untreated milk + retentate R-I | 1110 | 70 | 450,000 |
| Cream (CR) | 110 | 5 | 70,000 |
| Skim milk (SM) | 1000 | 60 | 420,000 |
| Skim milk + retentate R-II | 1099 | 60 | 420,900 |
| R-I | 110 | 600 | 1,210,000 |
| Permeate P-I | 989 | <1 | 91 |

-continued

|  | Amount kg./h | bacterial spores number per ml | Total number of bacteria per ml |
| --- | --- | --- | --- |
| R-II | 99 | <1 | 910 |
| P-II | 890 | <<<1 | <<10 |

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

What is claimed is:

1. A plant for treating low-fat milk, to obtain a reduced content of spores and bacteria and a substantially unchanged content of milk proteins, said plant comprising:
   b) a feed conduit for milk coupled to
      b1) a microfiltration unit (MF) for separating the milk into a spore- and bacteria-containing retentate and a permeate with a lower content of spores and bacteria, said MF unit being coupled to
         b1a) a conduit for the retentate and
         b1b) a conduit for the permeate respectively,
   characterised in that after the microfiltration unit, the permeate conduit is coupled to
   e) a second microfiltration unit for separating the first permeate into a second retentate and a second permeate said second microfiltration unit being coupled to
      e1) a conduit for the second retentate in the form of a recirculation conduit to the first microfiltration unit and to
      e2) a conduit for the second permeate respectively.

2. A plant according to claim 1 further comprising
   a) a centrifugal separator unit for separating milk into a cream fraction a fraction constituting said low-fat milk, and optionally a sludge fraction and
   b) a conduit for the skim milk fraction coupled to the microfiltration unit.

3. A plant according to claim 2 further comprising
   c) a conduit for the cream fraction coupled to a bacteria-controlling unit which in turn is coupled to a conduit for the cream treated in the bacteria-controlling unit and coupled to
   d) a uniting conduit to which the conduit for the second permeate also is coupled, in such a manner that the treated cream or a portion thereof and the permeate are united in the uniting conduit so as to form standardized milk.

4. A plant according to any of the preceding claims, characterised in that the first microfiltration unit and the second microfiltration unit have substantially the same pore size.

5. A plant according to any of the claims 1–3, characterised in that the average pore size of the two membrane units differ less than 50% from each other.

6. A plant according to claim 1, characterised in that each microfiltration unit comprises one or more microfiltration membranes of a type selected from the group consisting of plate-and-frame system, a tubular system, a spiral-wound system, a cassette system and the hollow fibre principle or a combination thereof.

7. A plant according to claim 1, characterised in that each microfiltration unit comprises one or more microfiltration membranes of a pore size ranging from 0.1 to 2.0$\mu$m.

8. A plant according to claim 7, characterised in that the pore range between 0.8–1.4μm.

9. A plant according to claim 7, characterised in that the first microfiltration unit has a pore size ranging from 0.8–2.0 μm and that the second microfiltration unit has a pore size ranging from 0.1–2.0μm.

10. A plant according to claim 2, wherein the conduit for the first retentate is formed as a recirculation conduit to the centrifugal separator unit.

11. A plant according to claim 10, wherein the recirculation conduit for the second retentate coupled together comprises a coupling conduit, the recirculation conduit a feed conduit leading to the centrifugal separator unit, the relevant flow path through the separation unit and the skim milk conduit which are all coupled together in the said sequence.

12. A plant according to claim 3, wherein the conduit for the first retentate with a conduit is coupled to the conduit for the cream fraction such that the first retentate is mixed with the cream fraction prior to the bacteria-controlling unit.

13. A plant according to any one of the preceding claims further comprising one or more membrane units, the first and the second membrane units being coupled in series, and in which the permeate conduit from the second membrane unit is coupled to a third membrane filtration unit, the permeate conduit thereof optionally being coupled to one or several subsequent membrane filtration units, in which each permeate conduit apart from a last membrane filtration unit, is coupled to the subsequent membrane filtration unit as a feed conduit and in which at least one retentate conduit is a recirculation conduit for feeding to a preceding membrane filtration unit.

* * * * *